(12) United States Patent
Dewey et al.

(10) Patent No.: US 8,701,599 B2
(45) Date of Patent: Apr. 22, 2014

(54) COVER AND DISPENSING DEVICE

(71) Applicant: Pawabunga! LLC, Minneapolis, MN (US)

(72) Inventors: Alan Joseph Dewey, Minneapolis, MN (US); Mark T. McCary, Edina, MN (US)

(73) Assignee: Pawabunga! LLC, Minneapolis, MN (US)

( * ) Notice: Subject to any disclaimer, the term of this patent is extended or adjusted under 35 U.S.C. 154(b) by 0 days.

(21) Appl. No.: 13/720,860

(22) Filed: Dec. 19, 2012

(65) Prior Publication Data

US 2013/0152871 A1     Jun. 20, 2013

Related U.S. Application Data

(60) Provisional application No. 61/577,497, filed on Dec. 19, 2011.

(51) Int. Cl.
*A01K 29/00* (2006.01)

(52) U.S. Cl.
USPC .......................................... 119/710

(58) Field of Classification Search
USPC .................. 119/710, 709, 711, 702, 707
See application file for complete search history.

(56) References Cited

U.S. PATENT DOCUMENTS

| | | | |
|---|---|---|---|
| 5,832,877 A * | 11/1998 | Markham | 119/710 |
| 6,129,053 A * | 10/2000 | Markham et al. | 119/710 |
| 6,202,598 B1 * | 3/2001 | Willinger | 119/709 |
| D453,864 S * | 2/2002 | Olivares et al. | D30/160 |
| 6,439,166 B1 * | 8/2002 | Markham | 119/710 |
| 6,546,896 B1 * | 4/2003 | Markham | 119/709 |
| D477,693 S * | 7/2003 | Kirch | D30/160 |
| D495,467 S * | 9/2004 | Tepper et al. | D1/199 |
| 6,886,496 B1 * | 5/2005 | Brown | 119/710 |
| 7,025,020 B2 * | 4/2006 | Brown | 119/710 |
| 7,194,981 B2 * | 3/2007 | Kirch et al. | 119/710 |
| 8,074,609 B2 * | 12/2011 | Adkins | 119/710 |
| 2004/0025803 A1 * | 2/2004 | Sherrill et al. | 119/710 |
| 2004/0126462 A1 * | 7/2004 | Tepper et al. | 426/89 |
| 2005/0100641 A1 * | 5/2005 | Lin | 426/132 |
| 2005/0217603 A1 * | 10/2005 | Hingst | 119/710 |
| 2008/0118606 A1 * | 5/2008 | Stern | 426/92 |
| 2008/0141948 A1 * | 6/2008 | Renforth et al. | 119/710 |

* cited by examiner

*Primary Examiner* — Yvonne Abbott

(74) *Attorney, Agent, or Firm* — Briggs and Morgan, P.A.

(57) ABSTRACT

A cover device that houses, protects and safely and economically dispenses an edible product, such as a rolled rawhide. The cover device substantially encases an edible rolled product and effectively prevents the pet from accessing the ends of the product. Relatively small access windows provide chewing access to the edible rolled product. The cover body has a hollow cavity and openings allowing access to the rolled product. The rolled product can be prevented from rotating within the cavity by one or more pin projections extending within the hollow cavity.

17 Claims, 9 Drawing Sheets

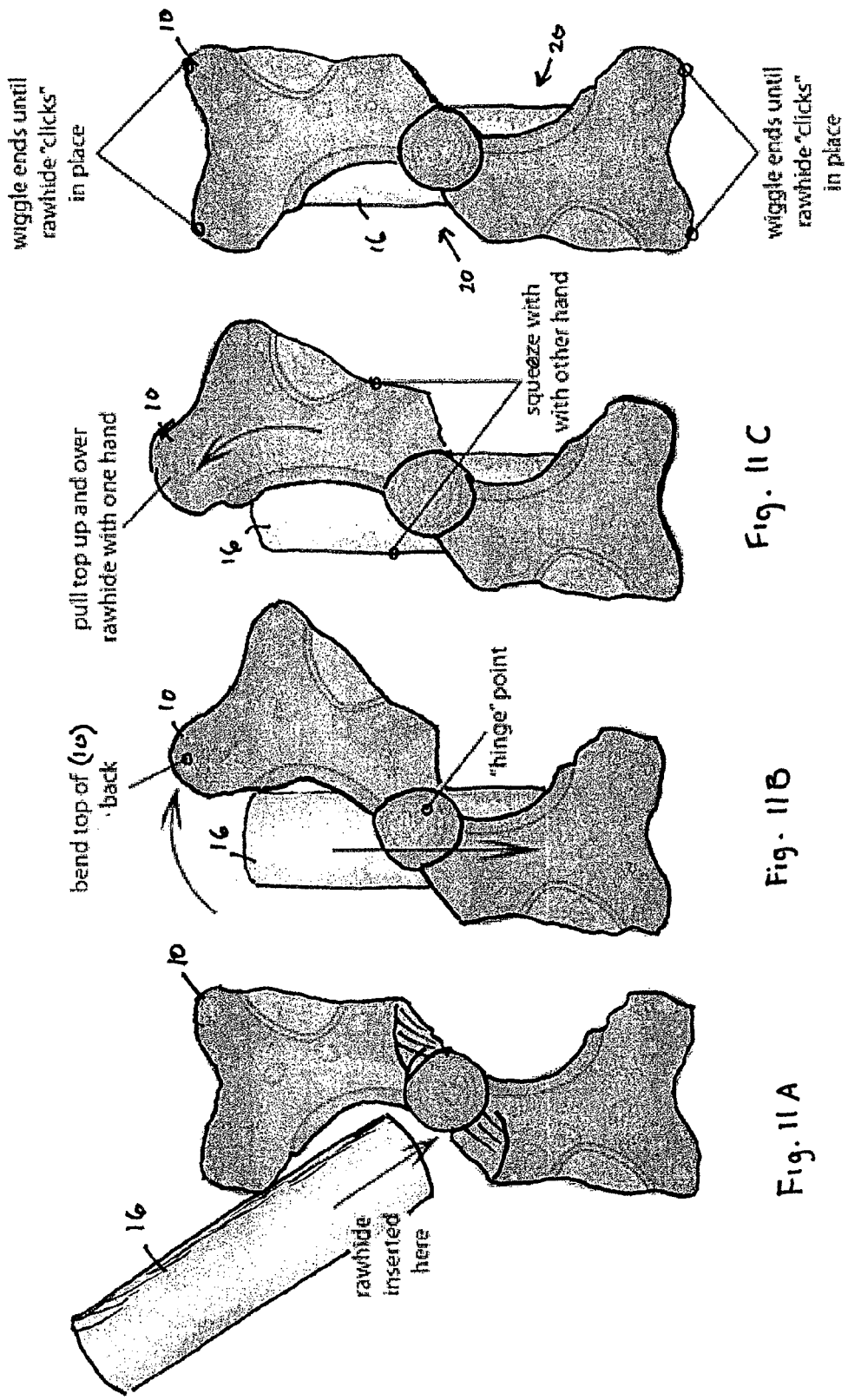

COVER AND DISPENSING DEVICE

RELATED APPLICATIONS

This application claims the benefit of U.S. Provisional Application Ser. No. 61/577,497, filed Dec. 19, 2011, and incorporated herein by reference.

TECHNICAL FIELD

The present invention generally relates to animal chew toys. More particularly, it relates to a cover which houses and dispenses an edible roll-shaped product, such as a rawhide roll.

BACKGROUND OF THE INVENTION

Pets play with objects of all kinds, including toys they chew and consume in part or entirely. Artificial bones and other teething toys for exciting the animal's interest and chewing instincts are well known in the art. Dogs, in particular, like to chew on household objects or manufactured pet toys.

Chewable objects perform a number of useful functions for pets. They provide exercise for the pets' jaw muscles, they massage the pets' gums and thus clean the pets' teeth and they provide relief during periods of tooth eruption when animals, specifically puppies, are teething. Chewable objects also provide entertainment for occupying the pets' attention. It is often the case that dogs instinctively consume, in part or in whole, objects that are not beneficial to the health of the animal. Even certain pet products for dogs can be detrimental to the dog when larger pieces are torn apart and consumed.

Chewable pet toys have been available for many years. Many are impregnated with odors or flavoring materials which are attractive to the pet. These toys are made of various materials, such as rawhide, rubber and plastic. One shortcoming of these products is that after a short period of time the flavor diminishes and the animal loses interest in the toy.

A variety of chew toys and chew products have been manufactured for the entertainment of pets. These chew toys and chew products are made from a variety of materials. For example, rawhide, woven fabrics, plastic or rope have been used but they are subject to breakdown from continued chewing and may also cause digestive problems if large or sharp pieces are swallowed. Softer chew toys and chew products may not be used while the pet is unattended for extended periods since, by instinct, pets will consume the pieces. More stable materials, such as rubber or plastic have also been used for such chewable objects but frequently these materials have undesirable tastes and quickly lose the attention of the pet. A variety of methods have been developed to impregnate chewable objects with odor or flavor extracts or animal meals. These products have limited success in exciting the pet into chewing a chew toy manufactured with undesirable materials.

A significant limitation of rawhide roll toys for pets includes the tendency of the pet to unwrap and quickly consume large portions of the rawhide roll. Such quick consumption of rawhide rolls is uneconomical and can even lead to severe digestive problems. It has been observed that free access to the exposed ends of the rawhide roll allows the pet to chew and quickly consume the rawhide roll. Another significant limitation of known rawhide rolls is the staining of furniture, carpet, clothing, etc. that come into contact with a saliva-wetted roll.

SUMMARY OF THE INVENTION

The present invention overcomes the disadvantages and shortcomings of the prior art by providing a non-edible cover that houses, protects and safely and economically dispenses an edible product, such as a rolled rawhide.

A cover device of the present invention substantially encases a rawhide roll or similar product and effectively prevents the pet from accessing the ends of the rawhide roll. Relatively small access windows are provided upon the device for chewing access to the rawhide roll. In one embodiment, small scent windows are provided adjacent the ends of the rawhide roll to further enhance the smell of the rawhide roll. The device of the present invention thus protects and extends the life of the rawhide roll as compared to traditional unprotected rawhide rolls. In addition to extending the life of a rawhide roll, the cover device of the present invention tends to prevent or minimize staining and damage to surfaces caused by contact with saliva-wetted rawhide rolls.

In one embodiment, the cover device is generally bone-shaped having an elongated body member with a bulbous portion at each end to cover and protect the ends of the rawhide roll. The body member has a hollow cavity along its axis and a pair of openings allowing access to the rolled rawhide. A chewable rawhide roll or similar product, which has a cross-section that corresponds to the shape of the hollow cavity, is held within the cover device.

The rolled rawhide or similar product is prevented from exiting the hollow cavity by end portions of the cover device. In one embodiment, the rolled rawhide or similar product is prevented from rotating within the cavity by one or more pin projections within the hollow cavity.

The rawhide roll may be sized to be held within a generally cylindrical hollow cavity of the cover device, e.g. the diameter and length of the roll is approximately the same size as the diameter and length of the hollow cavity. Preferably, the rawhide roll is slightly larger than the hollow cavity of the cover device so that the resilient body of the cover device tends to maintain the rawhide roll within the hollow cavity.

The rawhide roll may be accessible to the pet via a pair of access windows defined in the cover device. The access windows may be on opposite sides of the cover device. The access windows may be surrounded by a plurality of pet teeth engaging or gum stimulating structures. The access windows are preferably positioned away from the ends of the rawhide roll.

The rawhide roll may include one or more cavities for engaging a pin portion of the cover device. One or more pins engage the cavities of the rawhide roll and prevent the roll from being unwound by the pet. The pins may be molded into the chew toy or may be separate components positioned during assembly. In one embodiment, one cavity is aligned with the end edge of the roll.

Therefore, the principal object of the present invention is to provide an improved chew toy and chew product dispensing system. Yet another object of the present invention is to provide an improved chew toy and chew product dispensing system that occupies the pet for extended periods of time and will allow it to remain with the pet for any length of time unattended without fear of the pet eating the whole chew product causing harm to the pet or spoiling their appetite by consuming too much of the chew product. And finally, although carpets and other floor surfaces are not protected entirely by the present device, the degree of staining is reduced.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

DESCRIPTION OF THE DRAWINGS

In the accompanying drawings which form part of the specification and wherein like numerals and letters refer to like parts wherever they occur:

FIGS. 11A, 11B, 11C and 11D depict insertion of the rolled product of FIG. 8 into the cover device of FIG. 1.

DETAILED DESCRIPTION OF THE INVENTION

Figure 1:
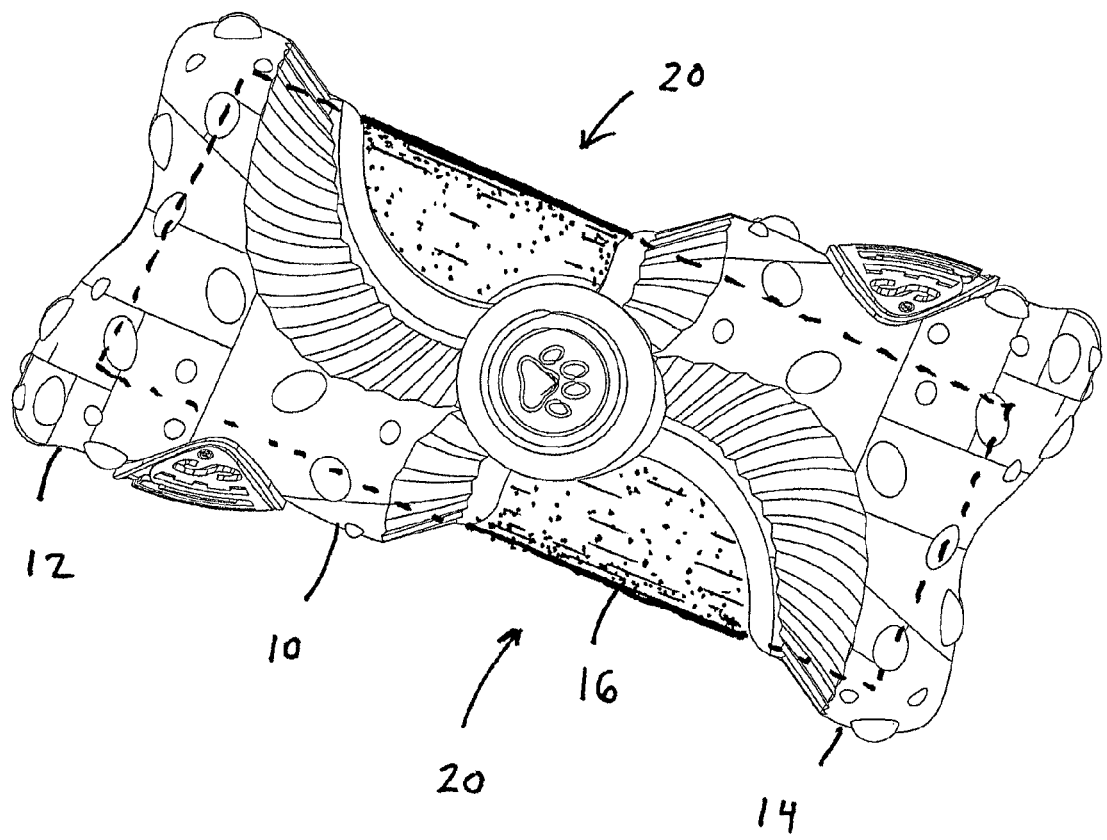
FIG. 1 is a perspective view of a cover device of the present invention.

Referring now to FIG. 1, the basic structure of the present invention is shown. The cover device includes an elongated cover body 10 having two bulbous knobs 12 and 14 at opposite ends for covering and protecting ends of the rawhide roll 16. Small portions of the rolled rawhide or similar product 16 extend from a cavity within the cover body 10 through a pair of access openings 20. The rawhide roll 16 is relatively hard so that it can function structurally, as further described herein. For example, the rawhide roll 16 may include a cavity which cooperates with pins to limit movement of the rawhide roll 16 from within the main body.

Figure 2:
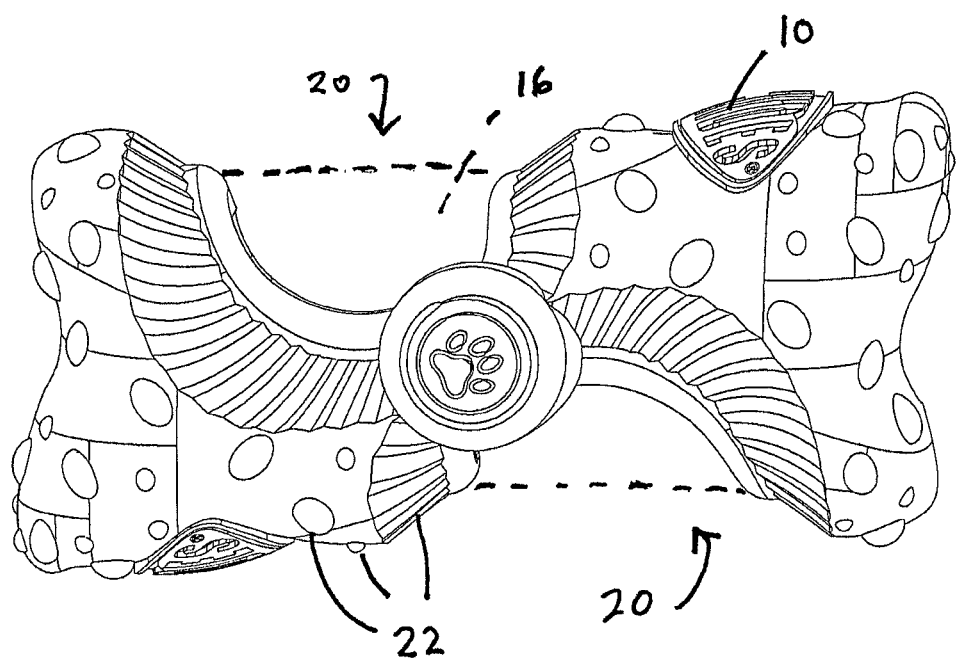
FIG. 2 is a top plan view of the cover device of FIG. 1.

FIG. 2 illustrates the cover body 10 removed from the rawhide roll 16. The outside surface of cover body 10 includes ridges, bumps and valleys and other protrusions to provide surface elements 22 which are stimulating to the mouth of the pet. In use, surface elements 22 provide a gentle massaging of the pet's gums.

Figure 3:
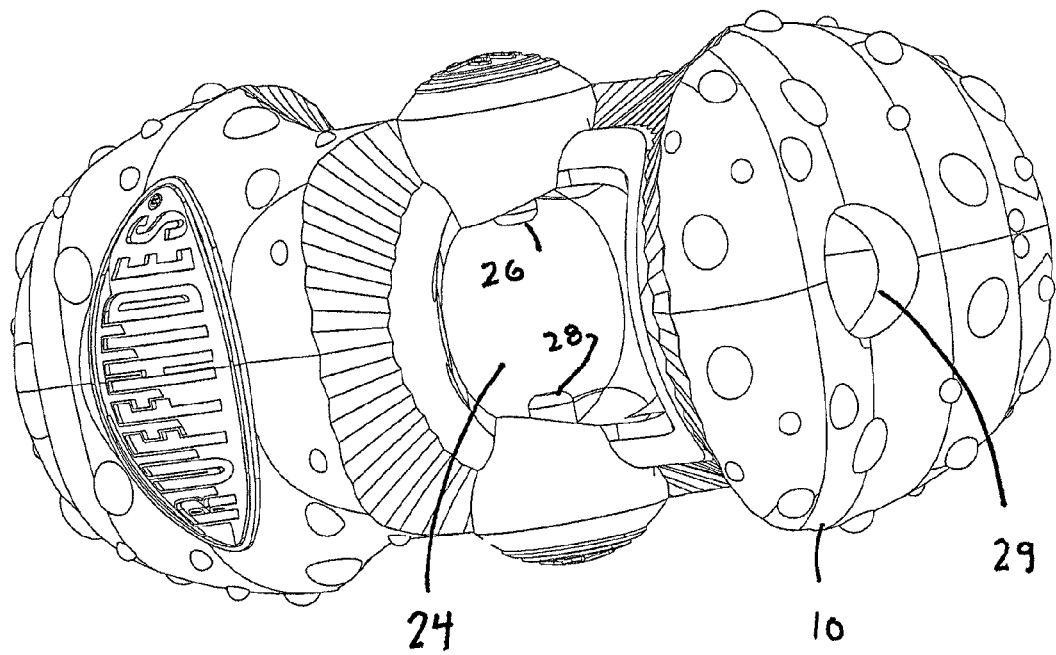
FIG. 3 is another perspective view of the cover device of FIG. 1.

Referring now to FIG. 3, a side perspective of the present invention of FIG. 1 is shown. Rawhide roll 16 (not shown) resides within the hollow cavity 24 within the main body 10 of the present invention. Pins 26, 28 are located near the center of the body 10 and each project inwardly toward each other. In one embodiment, the rawhide roll includes a pair of bores 30 which are engaged by pins 26, 28. Pins 26, 28 can be integrated into body 10 or may be separate components secured to body 10 during assembly. Pins 26, 28 may be metal, plastic, rubber, etc.

Figure 4:
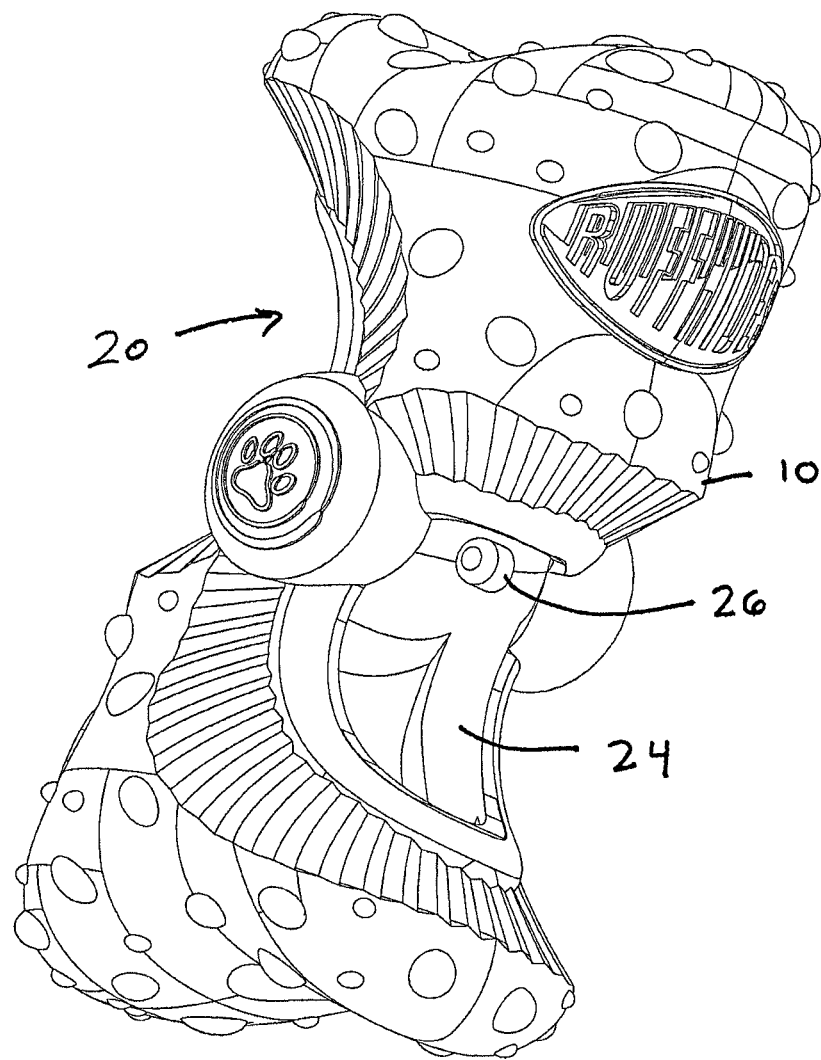
FIG. 4 is another perspective view of the cover device of FIG. 1.

FIG. 4 is another perspective view of body 10.

Figure 5:
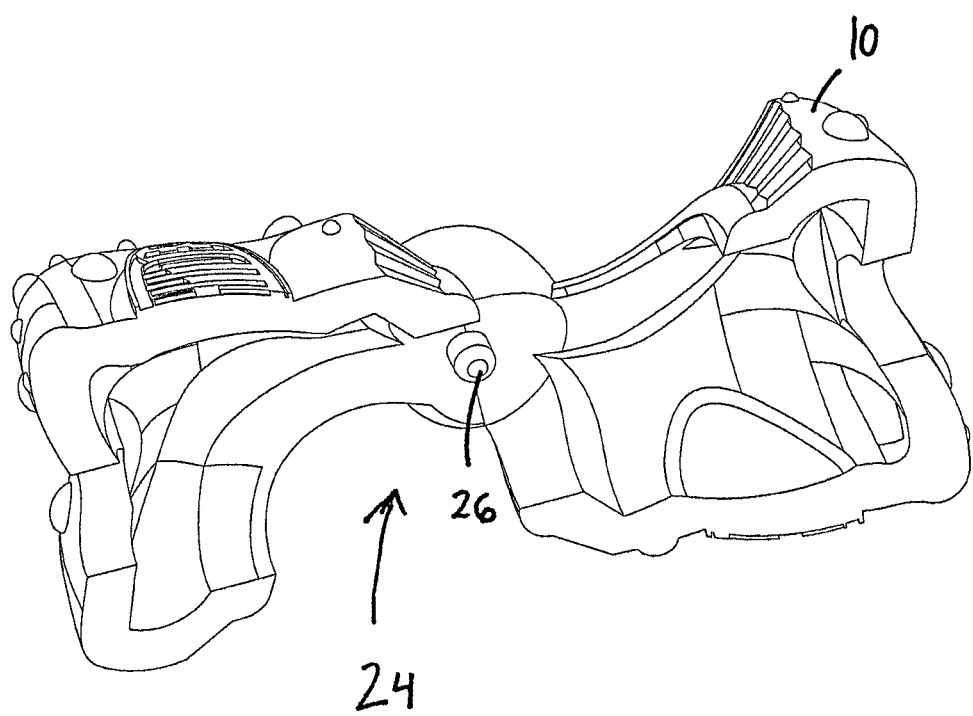
FIG. 5 is a cross-sectional view of the cover device of FIG. 1.
Figure 6:
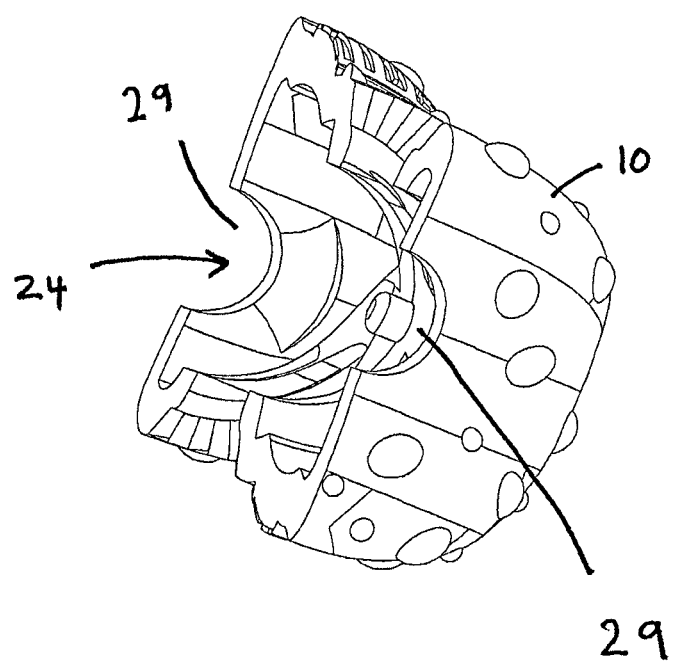
FIG. 6 is a perspective view of the cover device of FIG. 5.
Figure 7:
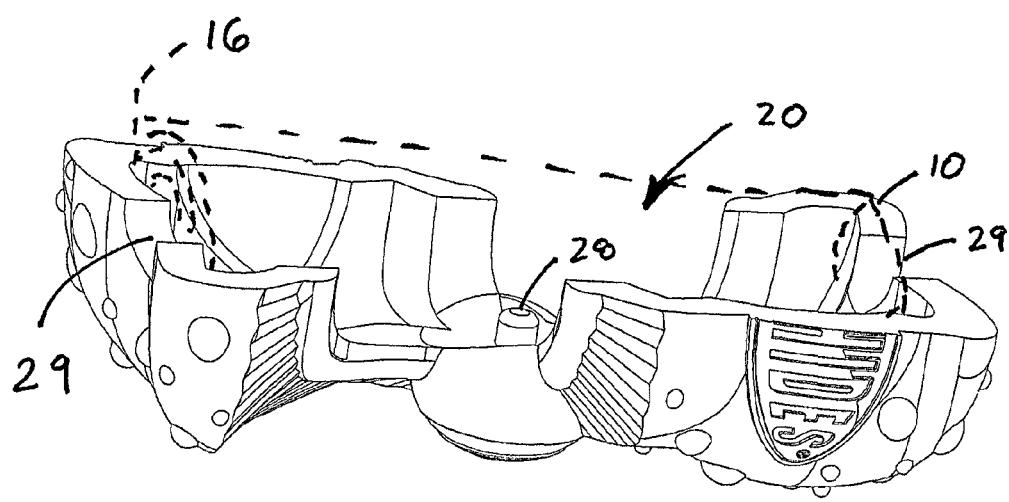
FIG. 7 is a perspective view of the cover device of FIG. 5.

FIGS. 5, 6 and 7 are cross-sectional views of body 10. As shown in FIGS. 6 and 7, the body 10 includes a pair of small openings 29 at opposite ends of the body. These small openings 29 allow the pet to smell the ends of the rawhide rolls 16 and tend to maintain or improve the pet's interest in playing with the product.

Figure 8:
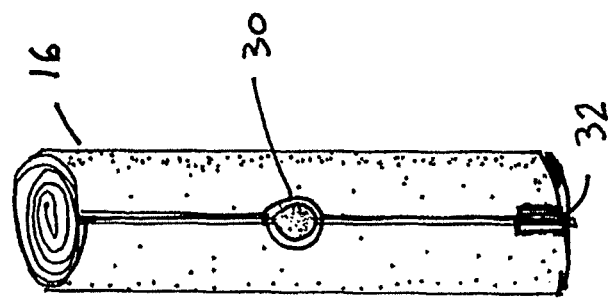
FIG. 8 is a perspective view of a rolled product suitable for use with the cover device of FIG. 1.

FIG. 8 is a perspective view of the rawhide roll 16. In a preferred embodiment of the invention, the rawhide roll 16 is a generally cylindrical roll of rawhide material.

FIG. 8 also shows an alternative means to prevent the rawhide roll from rotating within the body 10. A simple notch 32 may be positioned on the roll 16 with a corresponding structure of the body 10 (such as a shoulder, flat, etc.) adapted to engage the notch and prevent the roll 16 from rotating. The notch 32 may be positioned at an end of the roll 16 or at some intermediate location. In a preferred embodiment, the notch 32 is positioned directly upon the seam or end edge of the roll 16. By so positioning the notch 32, the seam or end edge can be automatically aligned away from the access windows upon inserting into the body 10, thus preventing the pet from grasping and unraveling the rawhide roll 16. In alternative embodiments, the notch 32 may be positioned at the circular end face of the rawhide roll 16.

Figure 9:
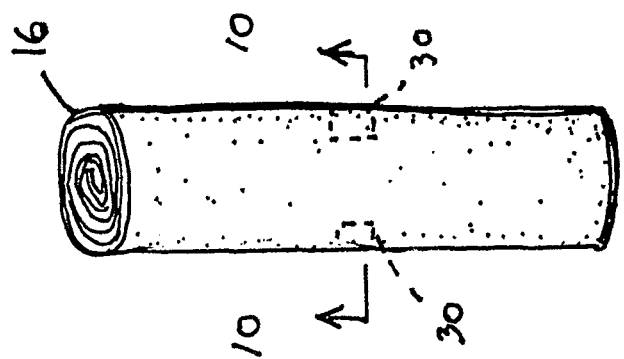
FIG. 9 is a perspective view of the rolled product of FIG. 8.

FIG. 9 is another perspective view of the rawhide roll 16. The bore 30 is preferably aligned with an end edge of the rawhide roll so as to limit the degree to which the roll can be unwound by pet chewing activity.

Figure 10:
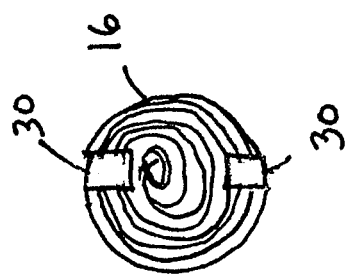
FIG. 10 is a cross-sectional view of the rolled product of FIG. 9 taken along lines 10-10.

FIG. 10 is a cross-sectional view of the rawhide roll 16 taken through lines 10-10 in FIG. 9. The pair of bores 30 are shown to extend inwardly toward a roll center. A diameter of bores 30 is sized to approximate a diameter of the pins 26, 28 of body 10.

In the illustrated embodiments, the generally cylindrical external shape of the rawhide roll 16 lies within cavity 24 within the main body 10. While the preferred embodiment has a cylindrical cavity which correspondence with a cylindrical food product, other non-circular cross-section shapes may be employed. Preferably, the food product fits closely enough within the cavity so that rotation of the food product with respect to the body of the invention is prevented or at least limited. While the preferred embodiment depicts the direct engagement between the pins and the bores of the food product, alternative means can be utilized to minimize unraveling of the rawhide roll.

FIG. 11 illustrates one method of inserting the rawhide roll 16 into the protective cover body 10. In FIG. 11A, roll 16 is inserted into cover body 10 as depicted by the arrow. FIG. 11B depicts bending back an upper portion of flexible body 10 while further inserting roll 16 into the cover body 10 as depicted by the arrow. FIG. 11C depicts pulling, lifting and covering the upper portion of roll 16 with the upper portion of the cover body 10 as depicted by the arrow. FIG. 11D depicts manipulating the cover body 10 relative to the roll 16 in order to seat the cover pins 26, 28 into the bore holes 30 of roll 16.

In use, the device is given to the dog to chew on with a chew product inserted. Either due to the natural playfulness of a particular dog, or due to the scent and taste of the chew product, or due to the dog's inability to break up the device and chew on the rest of the chew product, dogs tend to spend considerable time and effort chewing and gnawing on the device. The abstract bone-shaped configuration of the device is believed to contribute to its attraction to a dog. In addition, the contained chew product by its texture, odor, taste and relative softness substantially increases the device's attraction to the dog. As the device is chewed upon, the device is contacted on many different angles and in many different orientations. This causes the many parts of the body 11 to come in contact with most if not all surfaces of the dogs teeth. The dog thereby, in effect, cleans his own teeth to prevent tooth decay, while enjoying playing with the toy and masticating the chew product. One important aspect of the preferred embodiment of the invention is that the ends of roll 16 are covered by cover body 10 to protect against direct chewing by the pet.

While a particular form of the invention has been illustrated and described, it will also be apparent to those skilled in the art that various modifications can be made without departing from the spirit and scope of the invention. For example, another type of rolled food product may be used for roll 16. Furthermore, a variety of materials may be used for the body so long as the pet chew is soft enough to be chewable, yet resist tearing and destruction by the pet. The term "roll" as used herein is not limited to a "rolled" product. For example, in alternative embodiments roll 16 may be of a molded or formed material and not necessarily a rolled product. Roll product 16 is thus not limited to a sheet material, such as hide material, which is rolled upon itself. Roll 16 may assume a variety of cross-sections and not necessarily circular. Roll 16 may be cylinder-shaped or may assume a different form. In alternative embodiments, the roll 16 may comprise rolled beef or pork products. For example, roll 16 may comprise a beef jerky material. Roll 16 may also comprise a chew treat molded from ground beef, turkey, pork, chicken, fish, etc. Roll 16 may also comprise a hard biscuit material or "dental chew" material. In another embodiment, roll 16 comprises a yogurt stick or dried sausage or yak cheese materials. A variety pack of rolls 16 may include different meats or other materials.

The cover body 10 may comprise any plastic or rubber suitable for safe interaction with an animal. Preferably, the cover body comprises a resilient elastomeric material which may provide the durability required for longevity. Cover body 10 is preferably non-edible and is intended to be used over time with a plurality of edible roll products 16.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A roll product dispensing device comprising:
a resilient cover body having an elongated, generally cylindrical hollow cavity; and
a generally cylindrical pet-consumable product sized to be received into the hollow cavity of the resilient cover body, with portions of the cover body protecting ends of the product and with portions of the product away from the ends being accessible to the pet via one or more access windows in the cover body, and wherein the product is larger than the hollow cavity so as to deform the cover body upon insertion of the product into the cover body.

2. The device of claim 1 wherein the product is a rolled rawhide product.

3. The device of claim 2 further comprising a pin sized to engage a bore in the rawhide roll.

4. The device of claim 3 wherein the bore is positioned at an exposed edge of the rawhide roll.

5. The device of claim 3 wherein the one or more access windows comprises a pair of access windows, and wherein the pin is secured to the body between the pair of access windows.

6. The device of claim 5 wherein the pair of access windows are positioned generally opposite each other at sides of the cover body.

7. The device of claim 2 further comprising at least one scent window positioned in the body adjacent an end of the rawhide roll, said scent window allowing the pet to smell the end of the rawhide roll.

8. The device of claim 1 wherein the one or more access windows comprises a pair of access windows each positioned away from an end of the body.

9. The device of claim 8 wherein the pair of access windows are separated by approximately 180 degrees.

10. A method of protecting and dispensing a roll-shaped product to a pet comprising:
protecting ends of the roll-shaped product by inserting the roll-shaped product into a resilient protective cover, said cover including an interior elongated cavity with said roll-shaped product being larger than the elongated cavity so as to deform the cover upon insertion of the roll-shaped product into the cavity, said cover allowing only a small portion of the roll-shaped product to be easily accessed by the pet while preventing the ends of the roll-shaped product from being access by the pet, and
dispensing the roll-shaped product to the pet via one or more access windows in the protective cover, said access windows allowing the pet to access relatively small portions of the roll-shaped product thereby greatly increasing the duration of time the pet interacts with the roll-shaped product.

11. The method of claim 10 wherein the roll-shaped product is a rolled rawhide product, and said method further comprising aligning an edge of the rawhide roll away from one or more access windows in the protective cover.

12. The method of claim 10 wherein the roll-shaped product includes at least one bore into which a pin is inserted so as to limit the roll-shaped product from rotating within the protective cover.

13. The method of claim 10 further comprising:
providing at least one scent window proximate to one end of the roll-shaped product so as to maintain pet interest.

14. A roll product dispensing device comprising:
a resilient non-edible cover body having an elongated hollow cavity positioned between a pair of generally closed ends, with said cover body being deformable and including at least one opening allowing insertion of an elongated edible roll product into the hollow cavity, with the closed ends of the cover body protecting ends of the edible roll product from contact with a pet, and with other portions of the roll product being readily accessible to the pet, and wherein an outer surface of the cover body includes surface elements which are stimulating to the pet mouth.

15. The device of claim 14 wherein the roll product is a rolled rawhide product.

16. The device of claim 15 further comprising a pin sized to engage a bore in the rawhide roll.

17. The device of claim 16 wherein the bore is positioned at an exposed edge of the rawhide roll.

\* \* \* \* \*